United States Patent
Yan et al.

(10) Patent No.: US 12,013,855 B2
(45) Date of Patent: Jun. 18, 2024

(54) TRIMMING BLACKHOLE CLUSTERS

(71) Applicant: AMPERITY, INC., Seattle, WA (US)

(72) Inventors: Yan Yan, Seattle, WA (US); Aria Haghighi, Seattle, WA (US); Joseph Christianson, Seattle, WA (US)

(73) Assignee: AMPERITY, INC., Seattle, WA (US)

( * ) Notice: Subject to any disclaimer, the term of this patent is extended or adjusted under 35 U.S.C. 154(b) by 0 days.

(21) Appl. No.: 18/313,753

(22) Filed: May 8, 2023

(65) Prior Publication Data

US 2023/0273924 A1 Aug. 31, 2023

Related U.S. Application Data

(63) Continuation of application No. 16/938,233, filed on Jul. 24, 2020, now Pat. No. 11,704,315.

(51) Int. Cl.
*G06F 16/2453* (2019.01)
*G06F 16/2457* (2019.01)
*G06F 16/28* (2019.01)

(52) U.S. Cl.
CPC .. *G06F 16/24542* (2019.01); *G06F 16/24578* (2019.01); *G06F 16/285* (2019.01)

(58) Field of Classification Search
CPC ............. G06F 16/24542; G06F 16/285; G06F 16/24578
See application file for complete search history.

(56) References Cited

U.S. PATENT DOCUMENTS

| 2015/0269211 A1 | 9/2015 | Da Silva et al. |
| 2017/0069310 A1 | 3/2017 | Hakkani-Tur et al. |

OTHER PUBLICATIONS

Kardes, Hakan, et al. "Graph-based approaches for organization entity resolution in mapreduce," Proceedings of TextGraphs-8 Graph-based Methods for Natural Language Processing, 2013. (Year: 2013).*

* cited by examiner

*Primary Examiner* — Jay A Morrison
(74) *Attorney, Agent, or Firm* — George David Zalepa; Greenberg Traurig, LLP

(57) ABSTRACT

Disclosed are techniques for trimming large clusters of related records. In one embodiment, a method is disclosed comprising receiving a set of clusters, each cluster in the clusters including a plurality of records. The method extracts an oversized cluster in the set of clusters and performs a breadth-first search (BFS) on the oversized cluster to generate a list of visited records. The method terminates the BFS upon determining that the size of the list of visited records exceeds a maximum size and generates a new cluster from the list of visited records and adding the new cluster to the set of clusters. By recursively performing BFS traverse over the oversized cluster and extracting smaller new clusters from it, the oversized cluster is eventually partitioned into a set of sub-clusters with the size smaller than the predefined threshold.

20 Claims, 6 Drawing Sheets

TRIMMING BLACKHOLE CLUSTERS

CROSS-REFERENCE TO RELATED APPLICATIONS

This application is continuation of and claims the benefit of U.S. application Ser. No. 16/938,233, filed Jul. 24, 2020, which is incorporated by reference in its entirety.

COPYRIGHT NOTICE

A portion of the disclosure of this patent document contains material which is subject to copyright protection. The copyright owner has no objection to the facsimile reproduction by anyone of the patent document and the patent disclosure, as it appears in the Patent and Trademark Office patent files or records, but otherwise reserves all copyright rights whatsoever.

BACKGROUND

Currently, many organizations collect and store large amounts of data records in one or more databases. These data records may reflect customer information, business records, events, products, or other records. These records can accumulate from a number of data sources. For example, a retail company may sell products over different channels such as online e-commerce platforms as well as physical store locations. The retail company may maintain separate customer records for each of its different retail channels.

Frequently, organizations attempt to synchronize many records. For example, organizations may attempt to group multiple records for a single person or entity. Thus, a single person or entity can be associated with multiple records, generated by multiple sources. However, current approaches suffer from numerous drawbacks.

Many data sources are inaccurate. For example, many retail channels collect a customer's "address," but this address is incorrectly identified as, for example, the store address. Such a situation often occurs when data is collected at a point of sale, where a clerk or store employee enters a customer's data. In many instances, data is entered solely to complete a transaction and little if any attention is paid to its accuracy. As a result, multiple records having the same incorrect address may be stored in an organization's database. When an organization attempts to cluster records around individual entities, this results in very large clusters due to "similar" data being shared among distinct users. Thus, while most users will have one or two addresses, and fewer users will share an address, there will exist extremely large clusters of data associated with particular data points (e.g., the incorrectly entered store address). Thus, while a standard cluster for a user may include under ten records, such large clusters may have millions of records allegedly associated with a single user.

To compensate for this, many organizations attempt to apply rudimentary "business rules" to break apart such large clusters. Such attempts iterate through all pairs of records in a large cluster and attempt to filter out errant connections. Another strategy is to apply a hierarchal clustering algorithm to a large cluster to generate multiple sub-clusters. Both of these approaches provide reasonable results at a reasonable performance cost for small clusters (e.g., clusters having less than a thousand records). However, these techniques break down significantly for large scale clusters. Across a large dataset, performing pairwise comparisons has a time complexity of $O(n^2)$, while hierarchal clustering results has a time complexity of $O(n^3)$. Further, hierarchal clustering requires $O(n^2)$ memory and thus is infeasible for many large datasets.

BRIEF SUMMARY

The disclosed embodiments solve these and other problems by providing a technique for quickly segmenting a large cluster (referred to as a blackhole cluster) into multiple, smaller sub-clusters. The disclosed embodiments improve both the time required to process such large clusters but also reduce the memory needed to perform such operations when compared to existing techniques.

In one embodiment, a method is disclosed comprising receiving a set of clusters, each cluster in the clusters including a plurality of records; extracting an oversized cluster in the set of clusters; performing a breadth-first search (BFS) on the oversized cluster, the BFS generating a list of visited records; terminating the BFS upon determining that a size of the list of visited records exceeds a maximum size; and generating a new cluster from the list of visited records and adding the new cluster to the set of clusters.

In another embodiment, a non-transitory computer-readable storage medium for tangibly storing computer program instructions capable of being executed by a computer processor is disclosed, the computer program instructions defining the steps of: receiving a set of clusters, each cluster in the clusters including a plurality of records; extracting an oversized cluster in the set of clusters; performing a breadth-first search (BFS) on the oversized cluster, the BFS generating a list of visited records; terminating the BFS upon determining that a size of the list of visited records exceeds a maximum size; and generating a new cluster from the list of visited records and adding the new cluster to the set of clusters.

In another embodiment, an apparatus is disclosed comprising: a processor; and a storage medium for tangibly storing thereon program logic for execution by the processor, the stored program logic causing the processor to perform the operations of receiving a set of clusters, each cluster in the clusters including a plurality of records; extracting an oversized cluster in the set of clusters; performing a breadth-first search (BFS) on the oversized cluster, the BFS generating a list of visited records; terminating the BFS upon determining that a size of the list of visited records exceeds a maximum size; and generating a new cluster from the list of visited records and adding the new cluster to the set of clusters.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

DETAILED DESCRIPTION

Figure 1:
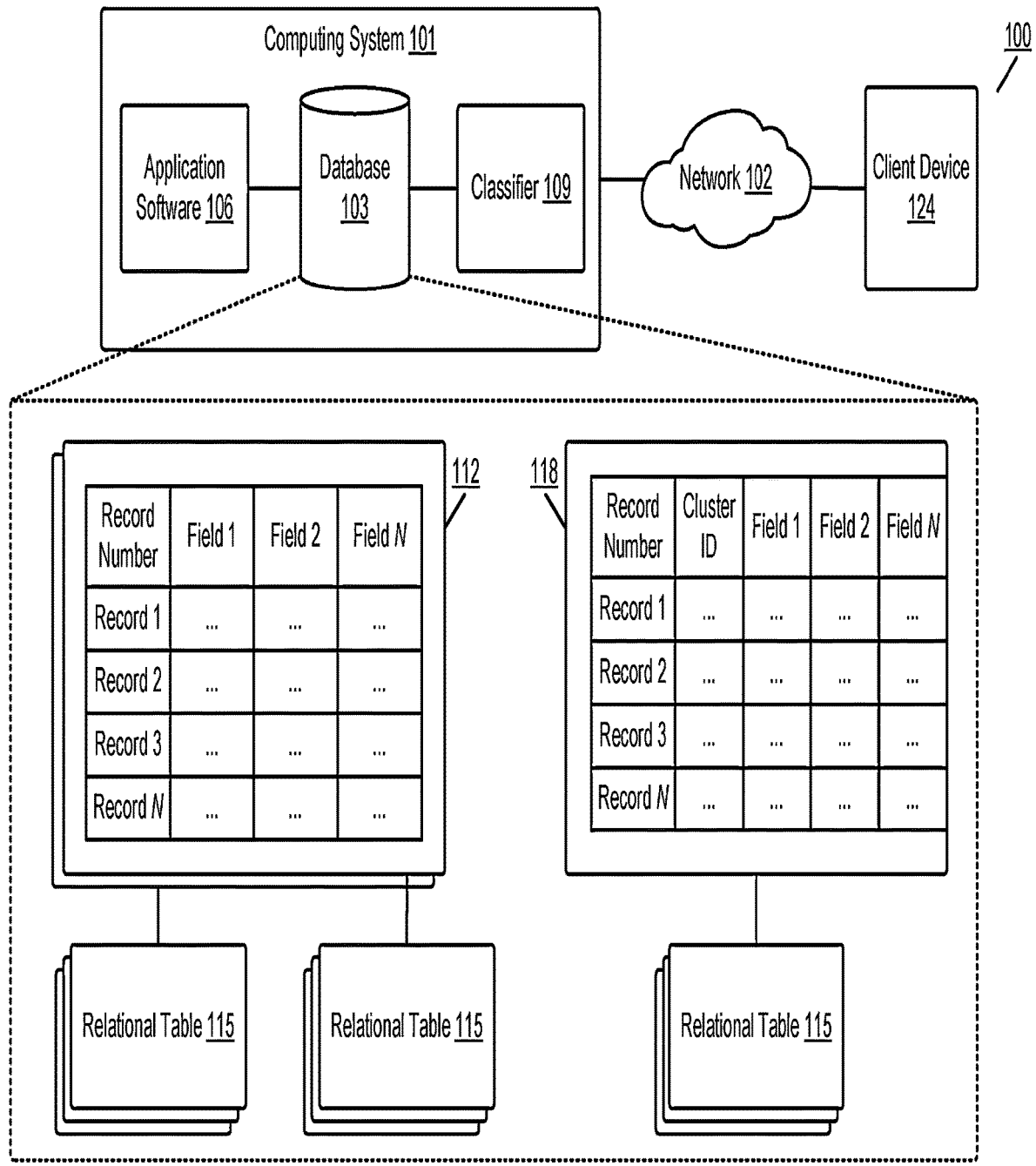
FIG. 1 is a block diagram of a system for clustering records according to some embodiments of the disclosure.

FIG. 1 is a block diagram of a system for clustering records according to some embodiments of the disclosure.

The system (100) includes a computing system (101) that is made up of a combination of hardware and software. The computing system (101) includes a database (103), a software application (106), and a classifier (109). The computing system (101) may be connected to a network (102) such as the Internet, intranets, extranets, wide area networks (WANs), local area networks (LANs), wired networks, wireless networks, or other suitable networks, etc., or any combination of two or more such networks.

The computing system (101) may comprise, for example, a server computer or any other system providing computing capability. Alternatively, the computing system (101) may employ a plurality of computing devices that may be arranged, for example, in one or more server banks or computer banks or other arrangements. Such computing devices may be located in a single installation or may be distributed among many different geographical locations. For example, the computing system (101) may include a plurality of computing devices that together may comprise a hosted computing resource, a grid computing resource, and/or any other distributed computing arrangement. In some cases, the computing system (101) may correspond to an elastic computing resource where the allotted capacity of processing, network, storage, or other computing-related resources may vary over time. The computing system (101) may implement one or more virtual machines that use the resources of the computing system (101).

Various applications and/or other functionality may be executed in the computing system (101) according to various embodiments. Also, various data is stored in the database (103) or other memory that is accessible to the computing system (101). The database (103) may represent one or more databases (103).

The components executed on the computing system (101) include a software application (106) and a classifier (109), which may access the contents of the database (103). According to various embodiments, the software application (106) is configured to generate hierarchical clusters using conflict resolution as described in FIG. 2 and de-cluster oversized clusters, as described in FIG. 3. The computing system (101) employs a classifier (109) that may be integrated into the software application (106) or may be implemented as a separate module, as illustrated. In some embodiments, the classifier (109) may be configured as a software application as part of application software (106). In other embodiments, the classifier (109) may be configured as external software (e.g., software running remote from application software, 106). In yet another embodiment, the classifier (109) may be implemented as a dedicated hardware device (e.g., an ASIC, FPGA, or other device). The classifier (109) may be an ordinal classifier. According to various embodiments, an ordinal classifier is a software component that receives two inputs and generates at least an ordinal label that reflects a degree of match between the two inputs.

For example, an ordinal label may include, but is not limited to, a "Strong-Match," "Moderate-Match," "Weak-Match," "Unknown," "Hard-Conflict." An "Unknown" label represents a case where there is no match, and the compared data contains no hard conflict. A "Hard-Conflict" represents a case where there is no match, and the compared data is inconsistent in a manner indicative of a hard conflict. Other user-defined ordinal labels may be used to express various classifications for performing hierarchical clustering or conflict resolution.

The data stored in the database (103) includes one or more database tables (112). A database table (112) includes several records, where each record has one or more corresponding fields. When stored in a relational database (103), a database table (112) may be linked to one or more relational tables (115). For example, if an airline company maintained a database table (112) that stored customer records, there may be a relational table (115) storing the flight history for each customer. The contents of the relational table (115) link to a corresponding record using, for example, a record ID or foreign key included in the table (112).

The software application (106) executing in the computing system (101) may generate a processed database table (118) by processing one or more database tables (112). For example, the processed database table (118) may be a merged database table that is generated by de-duplicating at least one database table (112). Thus, the processed database (118) includes information that allows one or more records to be consolidated in the event they are deemed to be a match. According to various embodiments of the disclosure, the degree of strength in a match is reflected in the merged database using, for example, a cluster ID.

According to various embodiments, the processed database table (118) is a relational database table that maintains the same relational links of the database tables (112) after it is processed.

The system (100) also includes one or more client device(s) (124). A client device (124) allows a user to interact with the components of the computing system (101) over a network (102). A client device (124) may be, for example, a cell phone, laptop, personal computer, mobile device, or any other computing device used by a user. The client device (124) may include an application such as a web browser or mobile application that communicates with the software application (106) to access, manipulate, edit, or otherwise process database tables (112). The software application (106) sends and receives information to and from the client device (124).

Next, a general description of the operation of the various components of the computing system (101) is provided. Various businesses or other entities utilize the computing system to store information in a database (103). For example, businesses may want to store records reflecting customers, products, transactions, events, items, or any other piece of information relevant to the business. Records are collected over time and stored in one or more database tables (112). For example, when a business gets a new customer, a software program may create a record reflecting the new customer. This record may include the customer's name, address, contact information, or any other information that identifies the customer. Such information is stored as fields within a database table.

In practice, a single record is sufficient to represent a customer. However, it is possible that duplicate (e.g., redundant) records are inadvertently or unintentionally created and/or exist within one or more databases (103). For example, a customer may register with a business via an online portal, which creates a customer record for that customer. Later, the same customer may inadvertently register again with the online portal, thereby creating a redundant customer record in the database table (112). Also, a company may have a first database table (112) for its brick and mortar customers and a second database table (112) for its e-commerce customers. It is possible that the same customer has a corresponding record in these two different database tables (112). As another example, two businesses maintaining their own customer records may merge such that the same customer may exist in two different database tables (112). The resulting processed database table could have redundant records reflecting the same customer.

Duplicate records are not necessarily identical. While they possess overlapping information, there may be field values that are different. For example, the field values of "Joe" and "Joseph" are not identical, yet they may be part of duplicate records. Because multiple records may represent the same real-world entity, it is desirable to group related records together so that they are clustered. A classifier (109) may be used to determine whether two records should be classified as a match based on the degree of related or common field values between the two records. The classifier (109) may determine the likelihood that a pair of records represent the same real-world entity, such as, for example, a particular customer. The classifier (109) may calculate a raw score that quantifies the degree of similarity between two records. The raw score may be converted to a normalized score. An ordinal label may be assigned to the normalized score. An example of this is depicted in Table 1 below, where a normalized score x is assigned an ordinal label if it falls within a particular range:

TABLE 1

| Normalized Score (x) | Ordinal Label |
| --- | --- |
| x ≤ 1 | Hard-Conflict |
| 1 < x ≤ 2 | Unknown |
| 2 < x ≤ 3 | Weak-Match |
| 3 < x ≤ 4 | Moderate-Match |
| 4 < x ≤ 5 | Strong-Match |

When performing a pairwise comparison of records, different combinations of field values among the two records are compared. For example, in one embodiment, the value of Field 1 of a first record is compared to the value of Field 1 of a second record, then the value of Field 2 of the first record is compared to the value of Field 2 of the second record, and so on. The comparison of two values yields a feature with respect to the record pair. A feature is a programmed calculation taking as inputs M records and/or other data such as external metadata and returns a numeric value as output. The variable M=2 in the case of handling a record pair. That numeric output may be, for example, a real value bounded between 0 and 1, or a binary value with two distinct outputs, 0 being considered "false" and one (1) being considered "true." A feature score is the specific output value generated by a feature for a given set of records or record pair. A feature score refers to the degree that two field values are the same.

For example, comparing the first name field value of "Joseph" to the first name field value of "Joe" may yield a "first_name_match" feature having a feature score of 0.88 on a scale of 0 to 1, where 0 means no-match and 1 means a perfect match. In other embodiments, the first name feature may be a binary value of "true/T," meaning match, or "false/F," meaning no-match. In addition, features may be determined based on a combination of field values. Here, a feature may be "full_name_match," which is a feature based on concatenating a first name field value with a last name field value.

Features are combined to form a feature signature. The feature signature quantifies the extent that a pair of records likely represent the same real-world entity. As an example, a feature signature may be made up of features such as "first_name_match," "last_name_match," "full_name_match," "email_address_match," etc. A feature signature resulting from a pairwise comparison is inputted into a classifier (109) to determine an ordinal label for the two inputs.

While the description above discusses pairwise comparisons between two records, hierarchical clustering, according to various embodiments, performs pairwise comparisons between inputs that may be clusters of records. A cluster may refer to a group of two or more records as well as a single record. A cluster of one record is referred to as a singleton cluster. For example, a pairwise comparison may compare one singleton cluster (a first input) to a cluster of multiple records (a second input). As described in further detail below, using clusters as inputs to a classifier (109) provides hierarchical clustering.

Figure 2:
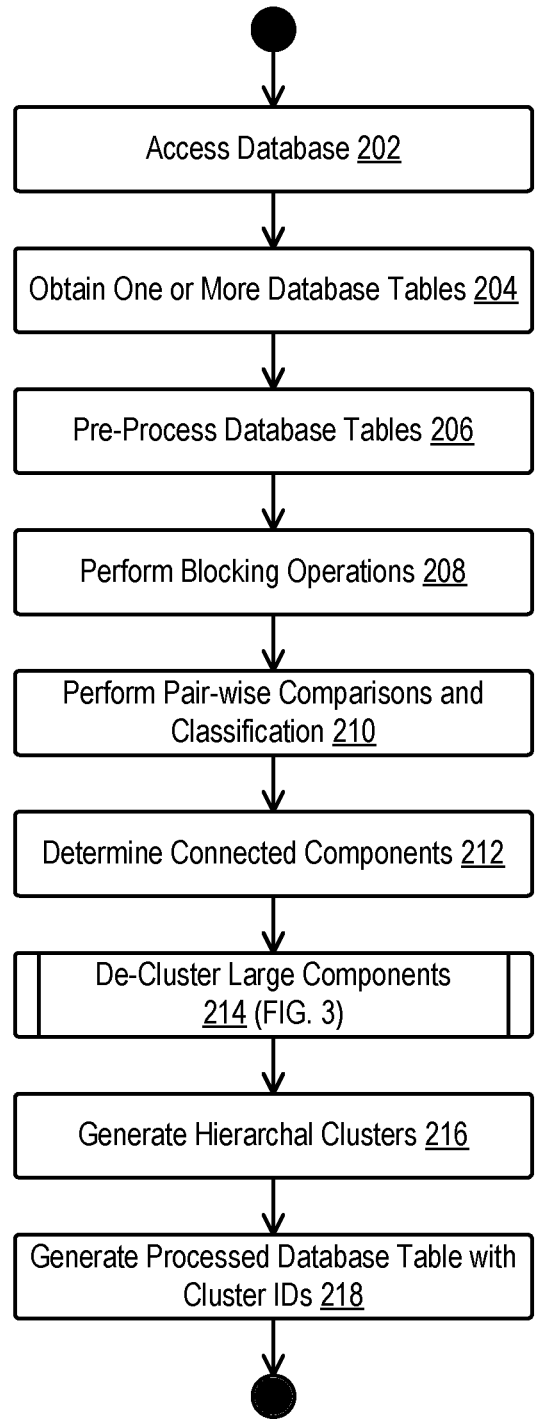
FIG. 2 is a flow diagram illustrating a method for performing hierarchical clustering of data records with conflict resolution according to some embodiments of the disclosure.

FIG. 2 is a flow diagram illustrating a method for performing hierarchical clustering of data records with conflict resolution according to some embodiments of the disclosure. The flow diagram of FIG. 2 provides an example of the many different types of functional arrangements that may be employed to implement the operation of the portion of the software application (106) as described herein. As an alternative, the flow diagram of FIG. 2 may be viewed as depicting an example of elements of a method implemented in the computing system (101) of FIG. 1 according to one or more embodiments.

In step 202, the method (200) accesses a database. In one embodiment, the method (200) accesses a database such as that depicted in FIG. 1. In some embodiments, the database comprises a relational database, while in other embodiments, the database may comprise any type of data storage device. In one embodiment, the method (200) remotely accesses the database while, in others, the method (200) accesses a local database.

In step 204, the method (200) obtains one or more database tables from the database. For example, the method (200) may download one or more database tables to local memory or cache. In other embodiments, the method (200) may present credentials to gain permission to access one or more database tables. In some embodiments, the one or more database tables include records that are subject to hierarchical clustering.

In step 206, if there are multiple database tables, method (200) preprocesses the database tables. For example, the method (200) may fuse or otherwise concatenate the database tables in a manner described in co-pending U.S. patent application Ser. No. 15/729,931, which is titled, "Effectively Fusing Database Tables" and which is incorporated by reference in its entirety.

In step 208, the method (200) performs one or more blocking operations. In the illustrated embodiment, a blocking operation is used to identify a block of records among the one or more database tables that are likely to refer to the same real-world entity. A blocking operation may provide a rough estimate of what records should be clustered together. A blocking operation may use a blocking rule that is based on whether the records across one or more database tables contain an exact match with respect to at least one field in the at least one database table. For example, a blocking rule may check whether there exists a first name and last name match across all records. This may form a block of records, which serves as a starting point for performing hierarchical clustering.

According to various embodiments, different blocking operations are performed before performing hierarchical clustering. Records in one or more database tables may be blocked according to a first blocking operation such as a name match rule and a second blocking operation such as an email match rule. Thus, a record within a database table may be associated with one or more blocks.

In some embodiments, the blocking operations may additionally include a filtering operation that excludes records that are clearly not related. In one embodiment, the filtering may include identifying a set of fields that can be used to exclude records. While in some scenarios, a single field may be used, multiple fields generally provide better accuracy. For example, a user's phone number, identified gender, and location may be used to "rule out" records as matching a single user. Notably, when using a single record (e.g., phone number, or gender), it is possible that a user may change such a field during the course of their life; thus, multiple fields are used to confirm an exclusion. In other embodiments, a timestamp may be used to filter records. For example, two similar records for "Jane Doe" may be present at the same time (or within a short time window) but have fields having vastly different value (e.g., home addresses in different continents). While some users may have addresses in varying locations, most users will utilize the same home address; thus, the combination of a timestamp (or window) and one or more fields may be used to filter clearly non-matching users.

In step 210, the method (200) performs pairwise comparisons and classifications for a given block of records. In one embodiment, the method (200) invokes a classifier to classify various input records. The method (200) performs pairwise comparisons and classifications on all record pairs within each block of records.

The pairwise comparisons identify a match status for record pairs within a set of records. The set of records may be organized into connected components by positive edges. A positive edge refers to a matched record pair or otherwise a record pair having a match status higher than a threshold level. A connected component refers to a subset of records derived from the records in one or more database tables. This is discussed in further detail below.

In one embodiment, the method (200) selects a pair of records to perform a pairwise comparison. A pair of records may be selected from a cluster made up of multiple records or a singleton cluster. The first input and second input in the pair of records may be selected by the method (200) according to a hierarchical clustering algorithm that iteratively selects inputs, as discussed in various embodiments below. Once the two inputs are selected, the method (200) performs a pairwise comparison. In one embodiment, a pairwise comparison comprises comparing the field values between the first input and second input to determine a feature for a particular field or set of fields. The pairwise comparison generates a feature signature which may be made up of various features of the fields' values being compared. The feature signature reflects how two inputs are similar or dissimilar based on the extent the field values are similar. In other words, the feature signature corresponds to a series of features between a pair of inputs being compared. A first pair of inputs may have the same feature signature as a different set of inputs even though the first pair represents a different entity than the second pair. In this case, it is inferred that the first pair of inputs are similar to each other in the same way that the second pair of inputs are similar to one another. For example, given the trivial set of features "Fuzzy Last Name match" and "Fuzzy First Name match", the first pair of inputs {"Stephen Meyles", "Steve Myles"} will generate a feature signature of [1 1], where "1" refers to a binary value indicating a match. In addition, a second pair of inputs {"Derek Slager", "Derke Slagr"} will also generate a feature signature of [1 1]. This does not necessarily mean that the first pair of inputs are related to the same real-world identity as the second pair of inputs. Instead, it suggests that the inputs have the same data variations (fuzzy matches of first and last name). Records with the same data variations will have the same signature.

After generating the feature signature, the method (200) may use a classifier to perform a classification of the feature signature. This classification process calculates a raw score that correlates to the strength that a particular feature signature indicates a match. The raw score may be any range of numbers. The raw score quantifies the confidence that a particular feature signature represents two inputs that refer to the same real-world entity. In some embodiments, the raw score may be normalized to a normalized score. In addition, an ordinal label may be assigned to the raw score or normalized score, as discussed above. To elaborate further, after calculating raw score or normalized score, the software application compares the raw score or normalized score to predetermined threshold ranges to yield a corresponding ordinal label that classifies the feature signature.

According to various embodiments, the classifier is configured using ordinal training data and/or hard conflict rules. Ordinal training data is generated from users who manually label test data to build business logic (e.g., a history) of how people would classify two inputs. The classifier is "trained" in the sense that it applies ordinal training 229 and extrapolates it and applies it to new combinations of input pairs. For example, if the ordinal training data indicates that a particular feature was repeatedly labeled as a "Moderate-Match" among a plurality of other labels, then the classifier will generate a raw score that corresponds to the ordinal label of "moderate-match."

According to various embodiments, the classifier can classify a pair of records or a pair of clusters. The classifier allows each field to be a vector, for example, an "email" field may be ["r-1 @test-one.com" "r-1 @test-two.com"]. When applying the classifier to cluster pairs, each semantic field is a concatenation of the semantic values from each cluster member. For example, a first input made of two records, R-1 and R-2, may have email address values of "email-r-1@test.com" and "email-r-2@test.com", respectively. The email field for this cluster becomes ["email-r-1@test.com", "email-r-2 test.com"].

When configured to apply hard conflict rules, the classifier may analyze the feature signature or the input pair and check whether a rule is violated. An example of a hard conflict rule is whether the field values for a "social security number" field is an exact match. If it is not an exact match, the classifier will apply an ordinal label of "Hard-Conflict" regardless of the remainder of the feature signature. If there are real-world scenarios where two records should never be clustered, it is appropriate to apply a hard conflict rule.

In step 212, the method (200) determines a subset of records such as, for example, a connected component based on the positive edges from the classification results. The concept of a connected component refers to grouping records together based on whether there is a sufficiently strong match between records pairs and by applying transitive association. For example, If R1 and R2 have a match and R2 and R3 have a match, then the method (200) connects R1, R2, and R3 through transitive association. In some embodiments, the method (200) applies a union-find algorithm to build a transitive closure representing the connected component. In this manner, the method (200) determines a connected component (e.g., R1, R2, and R3) which is a set of connected records within the blocks.

To elaborate further, the method (200) collects the positive record pairs (record pairs with the classifier score higher than the pre-specified threshold). After that, connected components are algorithmically constructed from the positive record pairs. In each connected component, every record is connected with others through one or more positive edges (to the extent one exists) directly or transitively. The method (200) continues across different connected components until there is no positive edge left.

Since records are allowed to be connected through transitivity inside the connected component, sometimes hard conflicts will occur, and sometimes not. Each connected component becomes the input of the hierarchical clustering algorithm. As discussed below, hierarchical clustering is applied to each connected component to further partition the component and resolve any hard-conflict it detects.

In step 214, after generating a plurality of connected components, the method (200) de-clusters any large connected components. Details of this sub-routine are provided in more detail in FIG. 3 and are not repeated herein.

In step 216, the method (200) generates hierarchical clusters for a given connected component. Hierarchical clusters may be stored as a key-value database as the hierarchical clusters are being generated by a software application. In step 218, the method (200) generates a processed database table. In some embodiments, the method (200) generates hierarchical cluster IDs for each record and assigns them to the records in the processed database table.

In one embodiment, the method (200) derives a connected component from one or more database tables. To derive or otherwise determine a connected component, records may be identified in response to first performing a blocking operation. Then, the method (200) performs a classification to identify positive record pairs; and lastly, the method (200) connects them together to form a connected component. Next, the method (200) may treat each record as a singleton cluster. In this respect, the pairwise comparisons are subsequently performed on two inputs, the inputs comprising a pair of singleton clusters.

In some embodiments, the method (200) further performs pairwise comparisons and classifications on remaining clusters to generate corresponding match scores as part of step 516. For the first iteration, the pairwise comparisons are performed on the various combinations of record pairs in the connected component. If a pairwise comparison was previously performed on a particular records pair, then the method (200) applies the result of that previously performed comparison without performing a redundant calculation. Because pairwise comparisons were performed to create the connected component, the results of these previous pairwise comparisons are stored and reused for future purposes of hierarchical clustering.

In some embodiments, the method (200) further removes hard conflicts from consideration as part of step 516. For example, the method (200) can look for two inputs where a hard conflict arises. The method (200) records instances of two inputs having a hard conflict to ensure that subsequent iterations of clustering will avoid clustering together those two inputs. Using ordinal classification and applying a "Hard-Conflict" label allows the software application to detect hard conflicts. Also, the software application may implement one or more hard conflict rules to screen for hard conflicts without classification. The method (200) may also identify the highest score above a minimum threshold. Here, the method (200) searches for the strongest match among the remaining clusters. The minimum threshold may be the lowest threshold for an acceptable match, such as a weak-match. Thus, the method (200) continues to iterate as long as there is at least a weak-match in the remaining clusters of the connected component.

In some embodiments, the method (200) further merges clusters using the highest match score as part of step 516. The inputs having the highest match score are merged into a single cluster. The inputs may be singleton clusters or multi-record clusters. This marks the completion of an iteration. Thereafter, the method (200) performs a subsequent iteration. In a subsequent iteration, the remaining clusters include some initial or intermediate cluster that was generated from a previous iteration.

In some embodiments, when there are no inputs having a sufficiently high match score, the method (200) assigns hierarchical cluster IDs to remaining clusters as part of step 516. As the method (200) iterates through performing pairwise comparisons and classifications, it generates hierarchical clustering, where each tier corresponds to a threshold match score. These threshold match scores may correspond to the ordinal labels assigned to various input pairs. Thus, the method (200) generates hierarchical cluster IDs according to the hierarchical clustering.

The following is an example of applying the flowchart of FIG. 2 to a database table made up of at least records $R_A$, $R_B$, $R_C$, and $R_D$. At step 202, one or more database tables are accessed to obtain records $R_A$ through $R_D$. The database tables are processed at step 206 to normalize records $R_A$ through $R_D$ so that their field values may be compared. At step 208, two blocking operations are performed on the processed database table. A first blocking operation blocks records according to name while a second blocking operation blocks records according to zip code. As a result, $R_A$, $R_B$, and $R_C$ form a first block while $R_A$ and $R_D$ form a second block. At step 210, the various record pairs of the first block ($\{R_A, R_B\}$, $\{R_A, R_D\}$, $\{R_B, R_C\}$) are compared and classified. The same applies to the second block where $R_A$ is compared to $R_D$. The record pairs $\{R_A, R_B\}$ and $\{R_A, R_D\}$ have match labels that exceed a threshold level. For example, they may correspond to a Strong-Match, Moderate-Match, or Weak-Match or any other status that indicates a minimum status for a match. The other records pairs, $\{R_B$-$R_C\}$ and $\{R_A$-$R_C\}$ correspond to a low match status, an unknown match status or a hard conflict, below the threshold level established as a minimum status for a match. At step 212, a connected component is created from $R_A$, $R_B$, and $R_A$. The connected component is derived from the various records in the database by blocking, classifying, and evaluating match scores. The connected component of $R_A$, $R_B$, and $R_D$ removes records having a hard conflict or records with sufficiently low match statuses. In one embodiment, the connected component may include more than three records. Indeed, in some embodiments, the connected component may have millions of records. In this scenario, in step 214, the method (200) would de-cluster the components exceeding a pre-configured maximum size. In one embodiment, the maximum size comprises a maximum number of records allowed in a cluster and may be configured based on the needs of the system. Since the exemplary cluster includes only three records, step 214 is skipped. At step 216, the connected component is subject to hierarchical clustering. Finally, in step 218, the database is populated with the hierarchal clustering results.

Figure 3:
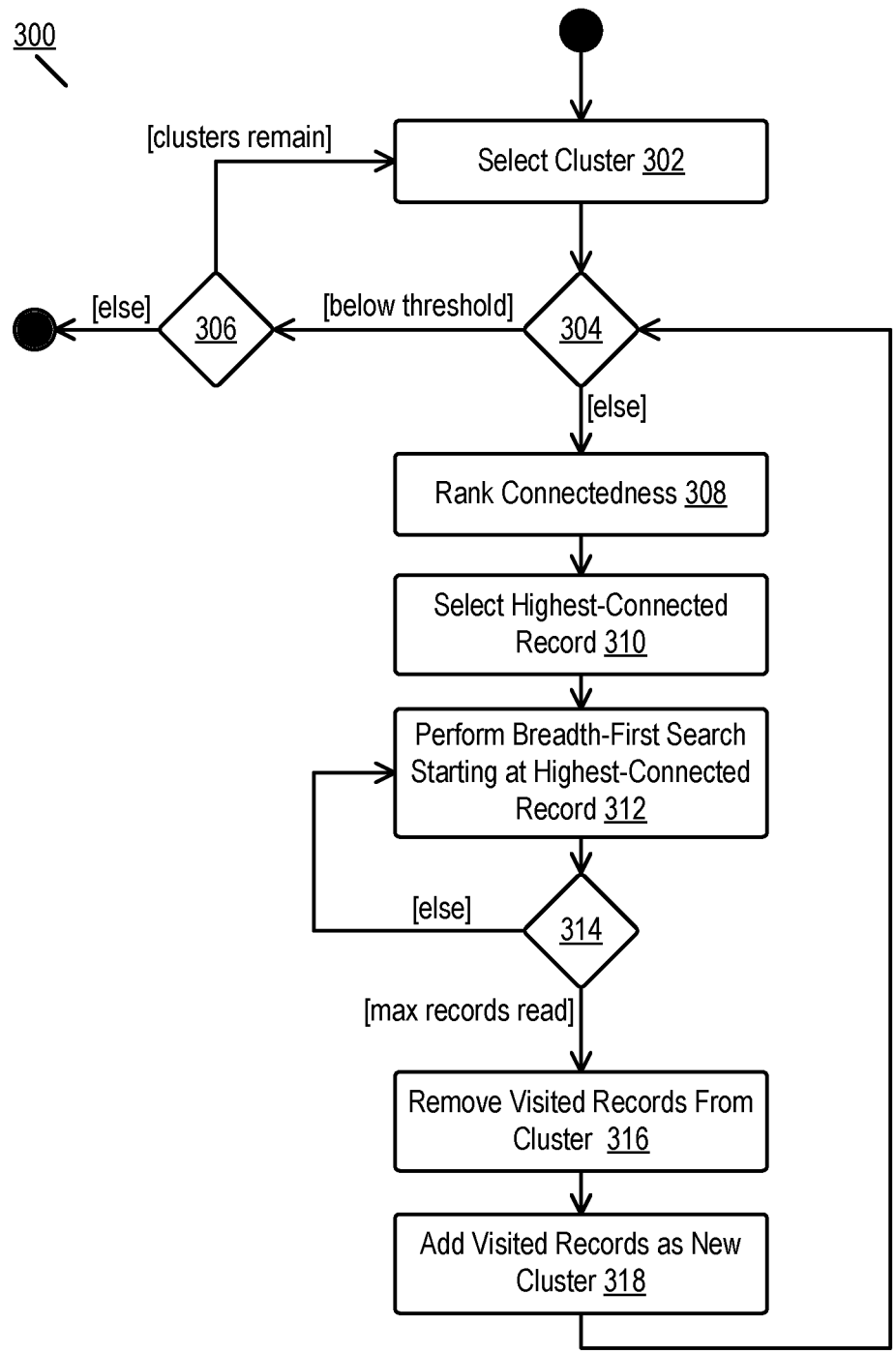
FIG. 3 is a flow diagram illustrating a method for de-clustering a large cluster according to some embodiments of the disclosure.

FIG. 3 is a flow diagram illustrating a method for de-clustering a large cluster according to some embodiments of the disclosure.

In step 302, the method (300) selects a cluster. In the illustrated embodiment, the cluster selected in step 301 comprises a component generated in step 210 of the method (200) depicted in FIG. 2. In general, each cluster comprises a plurality of records and a plurality of edges or connections between these records.

In step 304, the method (300) determines if the number of records in the selected cluster exceeds a pre-configured threshold. In some embodiments, this threshold is a static value (e.g., 1000). The specific value used may be tuned based on the system's needs, and the disclosure is not limited to any specific value for the threshold. In some embodiments, the threshold may be dynamically or functionally determined. For example, in some embodiments, the threshold may be computed as a function of the total number of records in all clusters. For example, if the total number of records in the cluster is n, the threshold may be defined as $c+\log(n)^b$, where c and b are tunable parameters whereby c defines a minimum threshold and $\log(n)^b$ increases the threshold as the total size n of the record space increases. The specific formula is not intended to be limiting.

If the method (300) determines that the cluster size is below the pre-configured threshold, the method (300) then determines if any clusters remain to be analyzed in step 306. If so, the method (300) re-executes steps 302 and 304 for each remaining cluster. If not, the method (300) ends.

In some embodiments, the method (300) steps through all clusters generated in step 212 of FIG. 2. In an alternative embodiment, the method (200) may record the size of clusters as they are being generated. In this scenario, the method (200) will execute the method (300) only on those clusters exceeding the pre-configured threshold. Thus, the method (300) can bypass step 304. As will be discussed, the method (300) executes steps 308 through 318 through all clusters exceeding the pre-configured size threshold.

In step 308, the method (300) ranks the connectedness (i.e., the number of connections) of the records in the cluster. As described in FIG. 2, each cluster includes a set of records and a plurality of edges between the records that represent pairwise connections between the records. Thus, each record has at least one edge. The method (300), in step 308, may access a database table that records the edge data. In some embodiments, the database table stores a record and a list of connected records. Thus, in some embodiments, the method (300) can simply sort this table using a sorting algorithm such as quicksort, merge sort, heap sort, etc. The specific algorithm is not limited but can be chosen to reduce the overall computational complexity of the process.

In step 310, the method (300) selects the highest-connected record. The highest-connected record refers to a record connected to the most records. As described, this element will comprise the highest rank item generated in step 308. In some scenarios, a single record will comprise the highest-connected record. In other scenarios, however, multiple records may have the same degree. In this scenario, the method (300) can arbitrarily choose a record. However, in some embodiments, the method (300) may use a degree weighting to select the highest-connected record. That is, as described above, edges between records may be weighted based on their strength. Thus, a record having three (total) strong edges may be selected as the highest-connected record compared to a record having three (total) weak edges.

In step 312, the method (300) performs a breadth-first search (BFS) on the cluster. In the illustrated embodiment, the method (300) starts the BFS at the highest-connected record selected in step 310. In the illustrated embodiment, when performing a BFS, the method (300) maintains an array of "visited" records as the BFS algorithm walks through the graph. As will be discussed, this list of visited records will be used to segment the graph upon determining that a maximum size is met. In some embodiments, an array, list, or other data structure is used to maintain the visited records.

In step 314, the method (300) determines if a maximum size is met. In some embodiments, the maximum size is equal to the pre-configured threshold. In step 312, the method (300) traverses the cluster, and the method (300) simultaneously records the records visited during the BFS. In the illustrated embodiment, the method (300) monitors the visited records to determine when the number of visited records hits a maximum size. For example, the method (300) may query the size of the array or list storing the visited records as it performs the BFS to determine if the maximum size is reached.

In some embodiments, this maximum size is a fixed value (e.g., 1000). In other embodiments, the maximum size may be specified by the operator of the method (300) and thus is an input parameter to the method (300). In yet another embodiment, the maximum size may be computed based on the size of the cluster. This computation may be done similarly to that described above regarding the triggering threshold that initiates the method (300).

If the method (300) determines that the maximum size has not yet been met, the method (300) continues to traverse the cluster using the BFS algorithm in step 312. If the method (300) determines that the maximum size was met, the method (300) proceeds to step 314.

In one embodiment, the method (300) may perform a further check as part of steps 312 and 314. Specifically, this check may comprise limiting the depth of the BFS. In some embodiments, this limit can be applied to the algorithm in step 312. For example, the method (300) may specify that the BFS algorithm should not exceed a depth from the highest-connected cluster of four (4). This limit reduces the likelihood of more irrelevant records being returned as part of the cluster centered around the highest-connected cluster. In some embodiments, this depth can be specified by the operator of the method (300).

In step 316, the method (300) removes the visited records from the cluster. In the illustrated embodiment, the method (300) removes all of the records in the data structure that stores the visited records from the original cluster. As part of this process, any edges between a visited and non-visited node are removed from the original cluster. Similarly, these same edges are removed from the visited nodes. As a result, after step 316, the method (300) will obtain two clusters: one comprising the original cluster less the visited nodes and the other comprising the visited nodes.

In step 318, the method (300) adds the visited records to the list of clusters generated in step 212. In this manner, the method (300) "updates" the clusters of records based on the "de-clustering" performed via the BFS. As a result, the method (200) receives a set of reasonably sized clusters that excludes any oversized or blackhole clusters.

In the illustrated embodiment, after executing step 318, the method (300) returns to step 304 to determine whether the size of the cluster exceeds the maximum size threshold.

In each iteration, the cluster analyzed in step 304 will be smaller, the previous cluster size less the visited records removed in step 316.

In a simplistic scenario, the cutting of the cluster in step 316 will result in two clusters: the visited cluster and the remaining cluster. In this scenario, the method (300) then performs steps 304 through 318 on the remaining cluster.

Figure 5A:
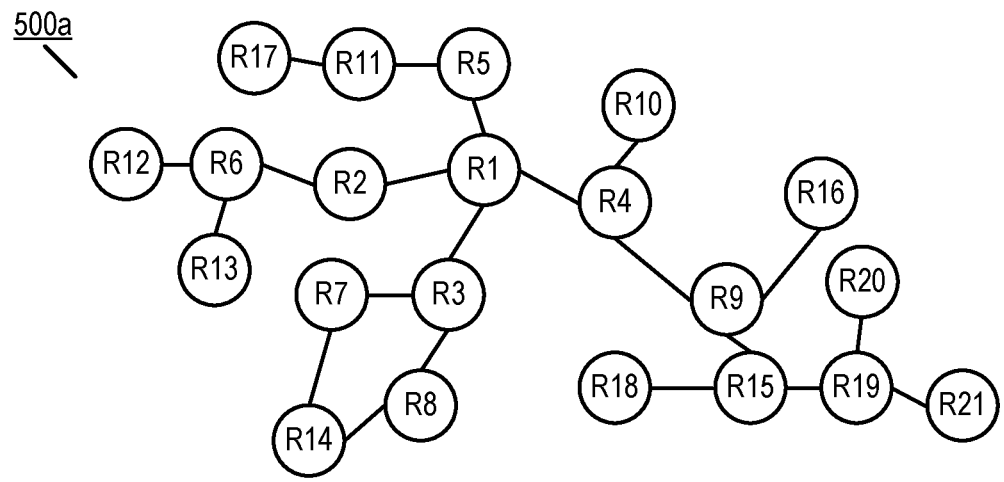
FIGS. 5A through 5C illustrate a blackhole cluster before and after de-clustering according to some embodiments.
Figure 5B:
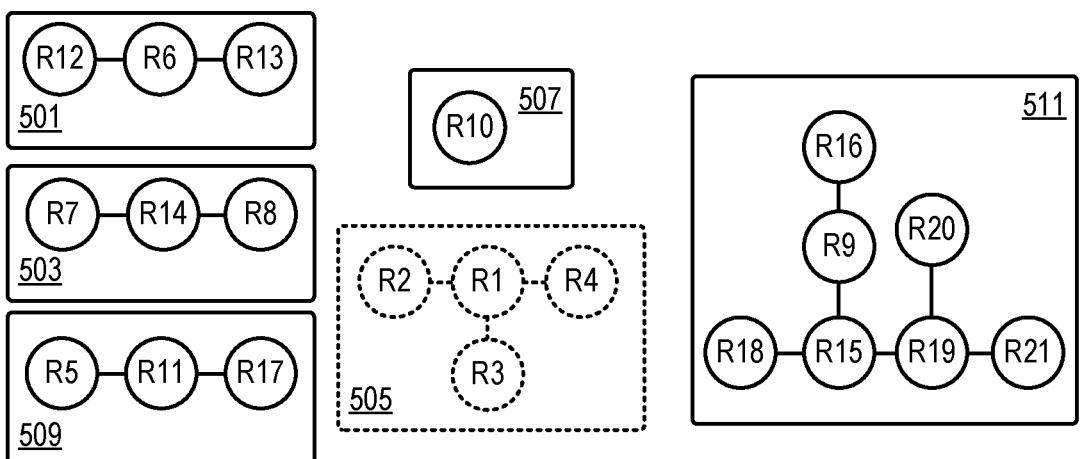
Figure 5C:
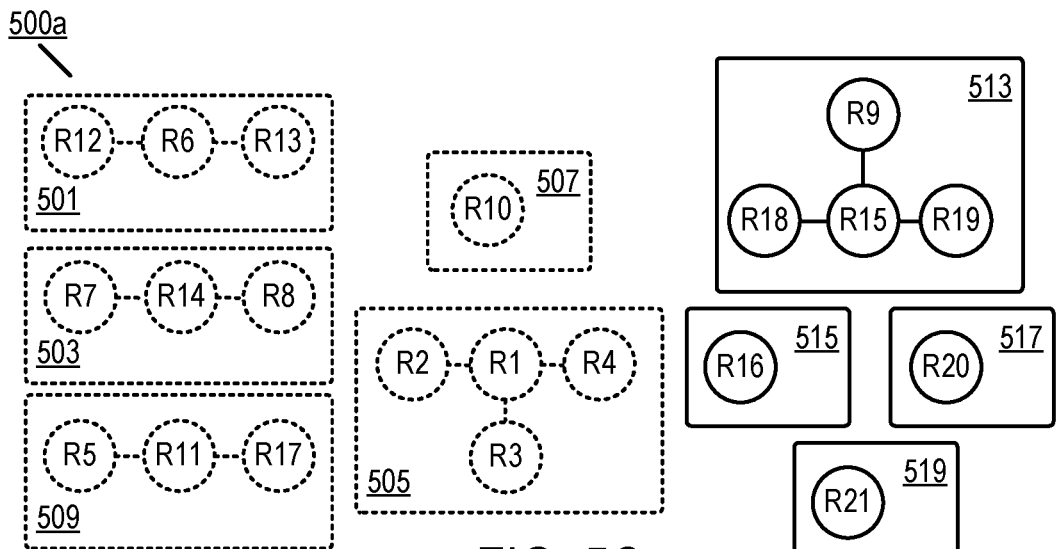

In more common scenarios, the result of the cutting in step 316 will result in a cluster of visited records (e.g., 505) and a remaining cluster that includes multiple unvisited records (as illustrated in FIGS. 5A through 5C), the unvisited records potentially representing additional clusters once visited. In this scenario, steps 304 through 318 can be parallelized to execute simultaneously on each cluster, thus improving the speed of the operation. That is, if there are two remaining clusters, steps 304 through 318 can be executed in parallel for each remaining cluster.

Ultimately, the method (300) will determine that no remaining cluster exceeds the maximum size. Alternatively, the method (300) may simply timeout. In either scenario, the method (300) has generated multiple new clusters that are smaller or equal to the maximum size and ends.

Figure 4:
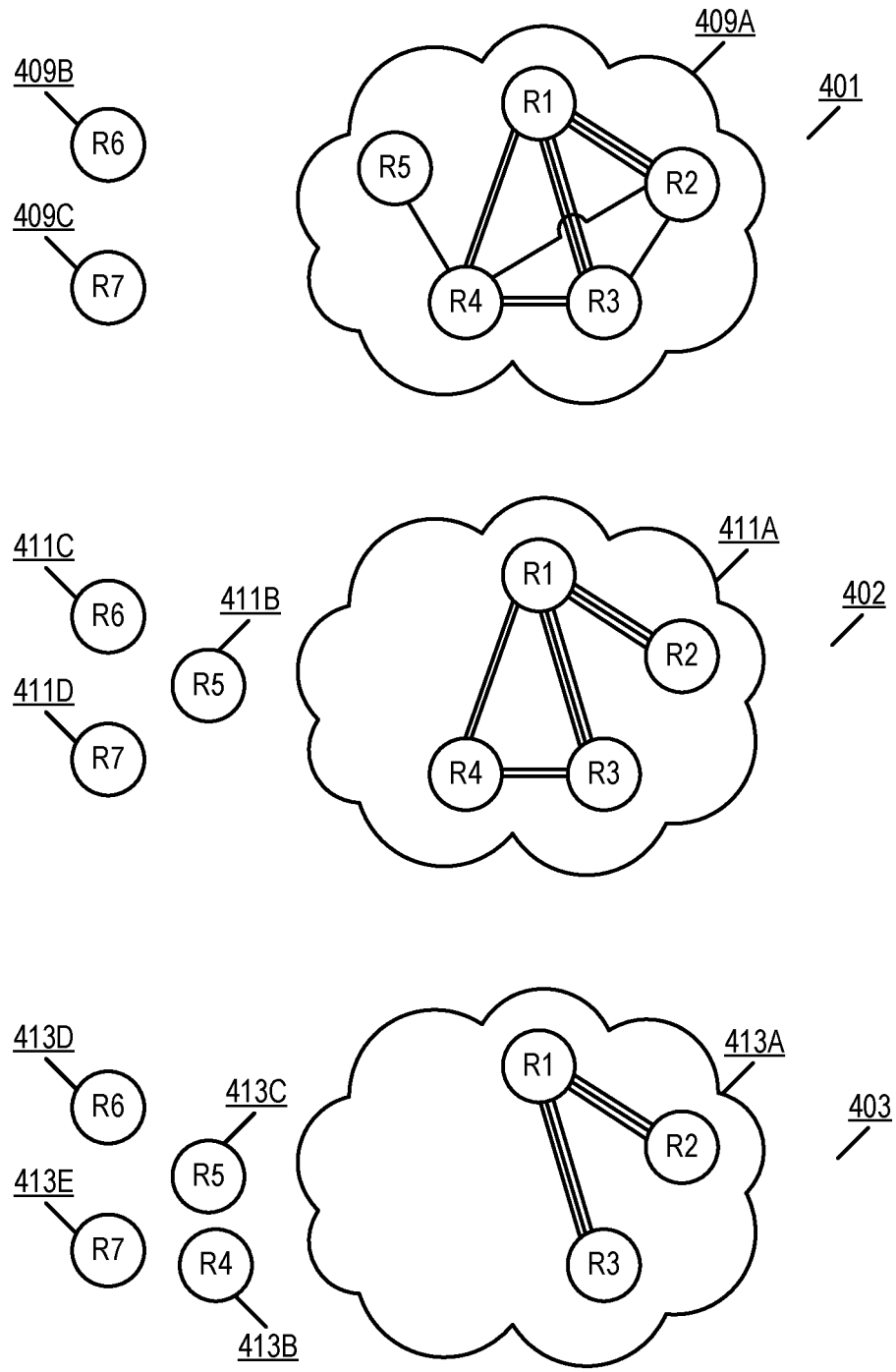
FIG. 4 is an example of a visual depiction of a hierarchical clustering generated by a software application executed in a computing environment according to some embodiments of the disclosure

FIG. 4 is an example of a visual depiction of a hierarchical clustering generated by a software application executed in a computing environment (such as that depicted in FIG. 1) according to some embodiments of the disclosure.

In this example, there are seven records R1-R7. These records may have been identified from one or more database tables and determining a connected component. Records R1-R7 represent records that have a likelihood of referring to the same entity such as a particular customer account.

A cluster of multiple records is depicted as a cloud bubble drawn around multiple records. Single records form singleton clusters. The strength of a match between two records is depicted by one or more lines between two records. Stronger matches are depicted with more lines while weaker matches are depicted with fewer lines. For example, R1 and R3 form a strong match, as depicted with three (3) lines while R2 and R4 depict a weaker match with one line.

The hierarchical clustering in this example is made up of multiple tiers where a bottom tier (401) applies a lower confidence matching, a middle tier (402), applies a moderate confidence matching, and an upper tier (403) applies a higher confidence matching. When a lower confidence matching scheme is applied, the software application is configured to cluster records that have a relatively weaker link. Accordingly, this may yield fewer clusters that are generally larger in size.

In the lower tier (401), the lower confidence matching yields a first cluster (409a) made up of records R1-R5, a second cluster (409b) made up of record R6 and a third cluster (409c) made up of record R7. Within the tier, the seven records R1-R7 have been consolidated into three groups or clusters. Consolidating records can lead to downstream processing efficiency depending on how the end user wishes to use the records. However, the tradeoff is that the clustering may include weaker matches.

In the middle tier (402), the moderate confidence matching yields a first cluster (411a) made up of records R1-R4, a second cluster (411b) made up of record R5, a third cluster (411c) made up of record R6, and a fourth cluster (411d) made up of record R7. Within the tier, the seven records R1-R7 have been consolidated into four clusters. When compared to a lower tier (401), the moderate tier (402) has more clusters, where the cluster size is smaller. For example, the first cluster (409a) of the lower tier (401) is split into two clusters (411a) and (411b) in the middle tier (402). Under the moderate matching scheme of the middle tier (402), weaker links, such as the link between R4 and R5 are not permitted to exist within a cluster.

In the upper tier (403), the higher confidence matching yields a first cluster (413a) made up of records R1-R3, a second cluster (413b) made up of record R4, a third cluster (413c) made up of record R5, a fourth cluster (413d) made up of record R6, and a fifth cluster (413e) made up of record R7. Within the tier, the seven records R1-R7 have been consolidated into five clusters. When compared to a lower tier (401) and moderate tier (402), the upper-tier has more clusters, where the cluster size is smaller. Under the upper tier, only strong matches are permitted when forming clusters.

According to various embodiments, the software application connects various records across different tiers (401, 402, 403) using a key-value database. A processed database table may be generated from the key-value database. In some embodiments of the above process, one or more of the clusters (409a, 411a, 413a) may be oversized. In some embodiments, an oversized cluster (or, blackhole cluster) comprises a cluster having a number of nodes or records that exceeds a pre-configured threshold. In response to detecting such blackhole clusters, the method (300) described in FIG. 3 may be executed on each of these clusters. FIGS. 5A through 5C illustrate the operation of this method on an example blackhole cluster.

FIGS. 5A through 5C illustrate a blackhole cluster before and after de-clustering according to some embodiments.

In FIG. 5A, a cluster (500a) (e.g., connected component) is depicted containing 21 records (R1-R210). The cluster (500a) depicted in FIG. 5A may be generated in the manners described in FIGS. 1 and 4. In the illustrated embodiment, the cluster (500a) is oversized since it exceeds a pre-configured threshold. In this embodiment, the pre-configured threshold is four records, but the specific numerical value of the threshold is not limited. As one example, a production deployment may have a pre-configured threshold in the hundreds or thousands of records. The specific threshold may be tuned as the system operates.

As a first stage, the system ranks each of the nodes (R1-R21) in order of its connectedness with other nodes (e.g., each node's degree). The following table illustrates the degrees of each node:

TABLE 2

| Node | Degree |
| --- | --- |
| R1 | 4 |
| R3, R4, R6, R9, R15, R19 | 3 |
| R2, R5, R7, R8, R11, R14 | 2 |
| R10, R12, R13, R16, R17, R18, R20, R21 | 1 |

Since R1 has the highest degree, it is selected as the root or seed of a BFS traversal. Examples of handling ties in degree are provided previously.

In the illustrated embodiment, the nodes (R1-R21) cluster (500a) are numbered to order the BFS traversal sequence. That is, a BFS routine will first visit R1, R2, R3, etc. In the illustrated embodiment, the maximum size is set to equal the pre-configured threshold (4). Thus, the BFS accesses, R1, R2, R3, and R4 before the system halts the BFS since the maximum size was reached. These records (R1-R4) are then removed from the cluster and added as a new cluster.

FIG. 5B illustrates the state of the cluster after removing the first set of visited nodes. As illustrated, visited nodes (505) are removed from the cluster, and five sub-clusters (501, 502, 503, 504, 506) are formed due to the cut. As illustrated, four of the sub-clusters (501, 502, 503, 504) are below the maximum size (4) and thus can be added as "new" clusters and removed from the cluster (500a). In some embodiments, the system may specify a minimum cluster size. In this embodiment, the system may completely discard clusters that do not meet the minimum size. For example, cluster (507) includes a single record (R10). In some embodiments, the system will discard this type of cluster since it provides no meaningful information. The specific minimum size is not limited in the disclosure. In an alternative embodiment, the system may not specify a minimum cluster size. In this embodiment, the system will retain all clusters, including small clusters.

In contrast, cluster (511) still exceeds the maximum size of (4), thus the system will re-execute steps 304-318 of the method (300) of this cluster (511). As described above, the system will first identify the highest-connected record in cluster (511). In the illustrated embodiment, the system recomputes the ranking based on the new cluster, the results of which are listed below:

TABLE 3

| Node | Degree |
|---|---|
| R15, R19 | 3 |
| R9 | 2 |
| R16, R18, R20, R21 | 1 |

As illustrated, nodes R15 and R19 have equal degree. As described previously, the weight of this degree may be used to break the tie. Alternatively, if the two nodes are equal, the system may randomly select a node. In the illustrated embodiment, the system selects R15 and proceeds to perform a second BFS starting at R15. During the BFS, the system visits R15, R18, R9, and R19 before the BFS is terminated since the maximum size is reached.

As illustrated in FIG. 5C, records R15, R18, R9, and R19 are used as the second new cluster (513), while the remaining records are cut into their own clusters (515, 517, 519). As described above, the system may add each of the clusters (513, 515, 517) to a set of all clusters or may optionally discard smaller clusters (515, 517, 519).

Figure 6:
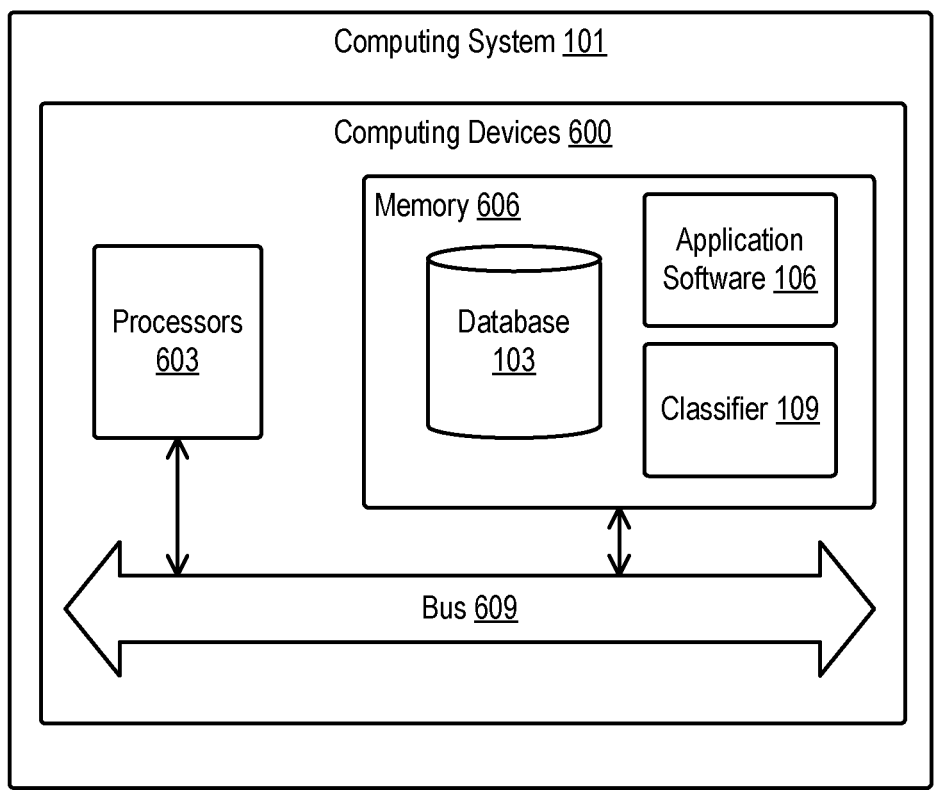
FIG. 6 is a block diagram illustrating a computing system according to some embodiments of the disclosure.

FIG. 6 is a block diagram illustrating a computing system according to some embodiments of the disclosure.

The computing system (101) includes one or more computing devices (600). Each computing device (600) includes at least one processor circuit, for example, having a processor (603) and memory (606), both of which are coupled to a local interface (609) or bus. To this end, each computing device (600) may comprise, for example, at least one server computer or like device. The local interface (609) may comprise, for example, a data bus with an accompanying address/control bus or other bus structure as can be appreciated.

Stored in the memory (606) are both data and several components that are executable by the processor (603). In particular, stored in the memory (606) and executable by the processor (603) is the software application (106) and classifier (109). Also stored in the memory (606) may be a database (103) and other data such as, for example a one or more database tables (112) and a processed database table (118). In addition, an operating system may be stored in the memory (606) and executable by the processor (603).

It is understood that there may be other applications that are stored in the memory (606) and are executable by the processor (603) as can be appreciated. Where any component discussed herein is implemented in the form of software, any one of a number of programming languages may be employed, such as, for example, C, C++, C #, Objective C, Swift, Java®, JavaScript®, Perl, PHP, Visual Basic®, Python®, Ruby, Clojure, Flash®, or other programming languages.

Several software components are stored in the memory (606) and are executable by the processor (603). In this respect, the term "executable" means a program file that is in a form that can ultimately be run by the processor (603). Examples of executable programs may be, for example, a compiled program that can be translated into machine code in a format that can be loaded into a random access portion of the memory (606) and run by the processor (603), source code that may be expressed in proper format such as object code that is capable of being loaded into a random access portion of the memory (606) and executed by the processor (603), or source code that may be interpreted by another executable program to generate instructions in a random-access portion of the memory (606) to be executed by the processor (603), etc. An executable program may be stored in any portion or component of the memory (606) including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory (606) is defined herein as including both volatile and nonvolatile memory and data storage components. Volatile components are those that do not retain data values upon loss of power. Nonvolatile components are those that retain data upon a loss of power. Thus, the memory (606) may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random-access memory (SRAM), dynamic random-access memory (DRAM), or magnetic random-access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor (603) may represent multiple processors (603) and/or multiple processor cores and the memory (606) may represent multiple memories (606) that operate in parallel processing circuits, respectively. In such a case, the local interface (609) may be an appropriate network that facilitates communication between any two of the multiple processors (603), between any processor (603) and any of the memories (606), or between any two of the memories (606), etc. The local interface (609) may comprise additional systems designed to coordinate this communication, including, for example, performing load balancing. The processor (603) may be of electrical or of some other available construction.

Although the software application (106) described herein may be embodied in software or code executed by general-purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts discussed above show the functionality and operation of an implementation of the software application (106). If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor (603) in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The software application (106) may also comprise software or code that can be embodied in any non-transitory computer-readable medium for use by or in connection with an instruction execution system such as, for example, a processor (603) in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random-access memory (RAM) including, for example, static random-access memory (SRAM) and dynamic random-access memory (DRAM), or magnetic random-access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including software application (106), may be implemented and structured in a variety of ways. For example, one or more applications described may be implemented as modules or components of a single application. Further, one or more applications described herein may be executed in shared or separate computing devices or a combination thereof. For example, the software application described herein may execute in the same computing device (600), or in multiple computing devices in the same computing system (101). Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method comprising:
   storing, in a database, a plurality of records, each record of the plurality of records referencing a cluster identifier of an oversized cluster, wherein at least one record in the plurality of records includes incorrect data, and wherein the plurality of records is received from a plurality of independent data sources and is associated with a plurality of entities;
   generating, via a server communicatively coupled to the database, a new cluster having a second cluster identifier based on visited records recorded during a breadth-first search (BFS) traversal over the plurality of records, wherein a size of the visited records is less than a maximum size; and
   writing, by the server, the new cluster to the database by updating each of the visited records to reference the second cluster identifier and writing a second new cluster to the database by updating a set of records unvisited during the BFS traversal to reference a third cluster identifier.

2. The method of claim 1, wherein the new cluster comprises a set of records in the visited records associated with a single entity.

3. The method of claim 1, wherein the maximum size is equal to a pre-configured threshold.

4. The method of claim 1, further comprising limiting a depth of the BFS.

5. The method of claim 1, wherein performing the BFS comprises initiating the BFS at a highest-connected record in the oversized cluster.

6. The method of claim 5, further comprising:
ranking records in the oversized cluster based on respective connectivity of each of the records; and
selecting a highest-connected record based on the ranked records.

7. The method of claim 6, further comprising:
removing the visited records from the oversized cluster and the ranked records;
selecting a second highest-connected record from the ranked records;
performing a second BFS on the oversized cluster, the BFS generating a second list of visited records,
terminating the second BFS upon determining that a size of the second list of visited records exceeds the maximum size, and
generating a second new cluster from the second list of visited records.

8. A non-transitory computer-readable storage medium for tangibly storing computer program instructions capable of being executed by a computer processor, the computer program instructions defining steps of:
storing, in a database, a plurality of records, each record of the plurality of records referencing a cluster identifier of an oversized cluster, wherein at least one record in the plurality of records includes incorrect data, and wherein the plurality of records is received from a plurality of independent data sources and is associated with a plurality of entities;
generating, via a server communicatively coupled to the database, a new cluster having a second cluster identifier based on visited records recorded during a breadth-first search (BFS) traversal over the plurality of records, wherein a size of the visited records is less than a maximum size; and
writing the new cluster to the database by updating each of the visited records to reference the second cluster identifier and writing a second new cluster to the database by updating a set of records unvisited during the BFS traversal to reference a third cluster identifier.

9. The non-transitory computer-readable storage medium of claim 8, wherein the new cluster comprises a set of records in the visited records associated with a single entity.

10. The non-transitory computer-readable storage medium of claim 8, wherein the maximum size is equal to a pre-configured threshold.

11. The non-transitory computer-readable storage medium of claim 8, further comprising limiting a depth of the BFS.

12. The non-transitory computer-readable storage medium of claim 8, wherein performing the BFS comprises initiating the BFS at a highest-connected record in the oversized cluster.

13. The non-transitory computer-readable storage medium of claim 12, further comprising:
ranking records in the oversized cluster based on respective connectivity of each of the records; and
selecting a highest-connected record based on the ranked records.

14. The non-transitory computer-readable storage medium of claim 13, further comprising:
removing the visited records from the oversized cluster and the ranked records;
selecting a second highest-connected record from the ranked records;
performing a second BFS on the oversized cluster, the BFS generating a second list of visited records,
terminating the second BFS upon determining that a size of the second list of visited records exceeds the maximum size, and
generating a second new cluster from the second list of visited records.

15. A system comprising:
a database;
a processor; and
a storage medium for tangibly storing thereon logic for execution by the processor, the logic comprising instructions for:
storing, in a database, a plurality of records, each record of the plurality of records referencing a cluster identifier of an oversized cluster, wherein at least one record in the plurality of records includes incorrect data, and wherein the plurality of records is received from a plurality of independent data sources and is associated with a plurality of entities,
generating a new cluster having a second cluster identifier based on visited records recorded during a breadth-first search (BFS) traversal over the plurality of records, wherein a size of the visited records is less than a maximum size, and
writing the new cluster to the database by updating each of the visited records to reference the second cluster identifier and writing a second new cluster to the database by updating a set of records unvisited during the BFS traversal to reference a third cluster identifier.

16. The system of claim 15, wherein the new cluster comprises a set of records in the visited records associated with a single entity.

17. The system of claim 15, wherein the maximum size is equal to a pre-configured threshold.

18. The system of claim 15, further comprising limiting a depth of the BFS.

19. The system of claim 15, wherein performing the BFS comprises initiating the BFS at a highest-connected record in the oversized cluster.

20. The system of claim 19, further comprising:
ranking records in the oversized cluster based on respective connectivity of each of the records; and
selecting a highest-connected record based on the ranked records.

\* \* \* \* \*